(12) United States Patent
Groarke

(10) Patent No.: US 11,037,120 B2
(45) Date of Patent: *Jun. 15, 2021

(54) SYSTEM AND METHOD FOR SETTING A HOT PRODUCT ALERT ON TRANSACTION DATA

(71) Applicant: MASTERCARD INTERNATIONAL INCORPORATED, Purchase, NY (US)

(72) Inventor: Peter Groarke, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,761

(22) Filed: Jun. 3, 2019

(65) Prior Publication Data

US 2019/0287088 A1    Sep. 19, 2019

Related U.S. Application Data

(63) Continuation of application No. 13/564,321, filed on Aug. 1, 2012, now Pat. No. 10,332,088.

(51) Int. Cl.
*G06Q 20/20* (2012.01)
*G06Q 30/06* (2012.01)

(52) U.S. Cl.
CPC ........... *G06Q 20/203* (2013.01); *G06Q 30/06* (2013.01)

(58) Field of Classification Search
CPC .............................. G06Q 20/20; G06Q 30/06
USPC ........................................................ 705/7.29
See application file for complete search history.

(56) References Cited

U.S. PATENT DOCUMENTS

| | | | |
|---|---|---|---|
| 6,636,585 B2 * | 10/2003 | Salzberg ................. | H04M 3/22 379/15.01 |
| 7,257,581 B1 | 8/2007 | Steele et al. | |
| 7,574,382 B1 * | 8/2009 | Hubert ................... | G06Q 10/00 705/26.61 |
| 8,032,765 B2 | 10/2011 | Dettinger et al. | |
| 8,037,471 B2 | 10/2011 | Keller et al. | |
| 8,311,944 B2 | 11/2012 | Knowles et al. | |
| 8,533,002 B2 * | 9/2013 | Mesaros ................. | G06Q 30/02 705/1.1 |

(Continued)

OTHER PUBLICATIONS

"Benefits of Open Payment Systems and the Role of Interchange", MasterCard Worldwide, U.S. Version, 2008, pp. 1-12.

(Continued)

*Primary Examiner* — Nga B Nguyen
(74) *Attorney, Agent, or Firm* — Ohlandt, Greeley, Ruggiero & Perle, LLP

(57) ABSTRACT

A system and a method for determining when a predetermined number of a specific product or of a type of product has been sold so that an alert can be generated when the number sold exceeds the predetermined number. Transaction rules can be set to monitor transaction data in a database to achieve this result. The transaction rules can be set for a generic product, for a specific product, or to exclude certain products. The system and the method issue an additional alert when data in a database indicates that the number of a specific product or of a type of product being sold in a selected time frame is below the selected predetermined number or another selected predetermined, for a selected period of time.

20 Claims, 3 Drawing Sheets

(56) References Cited

U.S. PATENT DOCUMENTS

| | | | |
|---|---|---|---|
| 8,781,945 B2* | 7/2014 | Preston | G06Q 40/00 |
| | | | 705/37 |
| 9,785,945 B2 | 10/2017 | Groarke et al. | |
| 9,811,837 B2 | 11/2017 | Groarke | |
| 9,818,152 B2 | 11/2017 | Groarke et al. | |
| 9,934,511 B2 | 4/2018 | Groarke | |
| 10,332,088 B2* | 6/2019 | Groarke | G06Q 20/203 |
| 2001/0043599 A1 | 11/2001 | Redmond | |
| 2002/0128899 A1 | 9/2002 | Collings et al. | |
| 2003/0023483 A1 | 1/2003 | Messner et al. | |
| 2003/0163483 A1 | 8/2003 | Zingher et al. | |
| 2003/0195791 A1 | 10/2003 | Waller et al. | |
| 2003/0216969 A1 | 11/2003 | Bauer et al. | |
| 2007/0192229 A1 | 8/2007 | Rowan | |
| 2008/0255960 A1* | 10/2008 | Nguyen | G06Q 30/0212 |
| | | | 705/14.14 |
| 2008/0255973 A1 | 10/2008 | El Wade et al. | |
| 2009/0119209 A1 | 5/2009 | Sorensen et al. | |
| 2009/0189760 A1* | 7/2009 | Preston | G06Q 40/04 |
| | | | 340/540 |
| 2009/0287536 A1 | 11/2009 | Sheng | |
| 2010/0076813 A1 | 3/2010 | Ghosh et al. | |
| 2010/0153204 A1* | 6/2010 | Shaw | G06Q 20/203 |
| | | | 705/14.25 |
| 2010/0191594 A1 | 7/2010 | White et al. | |
| 2010/0318408 A1 | 12/2010 | Sankaran et al. | |
| 2011/0119162 A1 | 5/2011 | Cohen | |
| 2011/0125393 A1 | 5/2011 | Williams et al. | |
| 2012/0036042 A1 | 2/2012 | Graylin et al. | |
| 2012/0084119 A1 | 4/2012 | Vandehey et al. | |
| 2012/0150742 A1 | 6/2012 | Poon et al. | |
| 2012/0185368 A1 | 7/2012 | Schloter et al. | |
| 2012/0303411 A1 | 11/2012 | Chen et al. | |
| 2013/0246125 A1 | 9/2013 | DiGioacchino et al. | |
| 2014/0006096 A1 | 1/2014 | Groarke | |
| 2014/0006107 A1 | 1/2014 | Groarke | |
| 2014/0006131 A1 | 1/2014 | Causey et al. | |
| 2014/0006198 A1* | 1/2014 | Daly | G06Q 30/06 |
| | | | 705/24 |
| 2014/0039974 A1 | 2/2014 | Groarke et al. | |
| 2020/0239290 A1* | 7/2020 | High | G05D 1/0246 |

OTHER PUBLICATIONS

Christian von Weizsäcker, "Economics of Credit Cards—Expert Report on behalf of MasterCard International Incorporated and Europay International SA", Jan. 23, 2002, pp. 1-29.

John Bulmer, "Payment Systems: The Credit Card Market in Canada", Library Bibliothèque of Parliament du Parlement, Sep. 24, 2009, pp. 1-8.

* cited by examiner

SYSTEM AND METHOD FOR SETTING A HOT PRODUCT ALERT ON TRANSACTION DATA

CROSS REFERENCE TO RELATED APPLICATION

The present application is a continuation patent application claiming priority to U.S. patent application Ser. No. 13/564,321 filed on Aug. 1, 2012, the entirety of which is incorporated by reference herein.

BACKGROUND OF THE DISCLOSURE

1. Field of the Disclosure

The present disclosure relates to payment card systems. More particularly, it relates to a system and a method for exploiting the information generated by the transactions conducted on such systems, to provide alerts when sales of certain products or product types increase greatly.

2. Description of the Related Art

The first credit payment systems were two party systems in which a merchant sold goods to a customer without requiring full or any initial payment, and the customer paid for the goods at a later date, or made periodic payments over a predetermined period of time. These two party system methods of payment are of limited scope, and are not flexible in that they involve only one merchant, and the customer must make individual arrangements with each and every merchant, and for each and every transaction.

In a three party system, a single card issuer contracts with customers and issues credit cards to them. The issuer also contracts with merchants, who agree to make sales to customers having a credit card from the issuer. When a card is presented at a merchant's establishment, it is generally the issuer who approves the transaction and pays the merchant. However, this system, a so-called closed system, has occasionally been modified so that another party approves the transaction and interacts with the merchant.

MasterCard, the assignee of the present application, operates within what is known as a "four-party" payment card system. The four key participants in a four-party system are: (i) the consumer and business cardholders that use the cards; (ii) the merchants that accept the cards; (iii) the financial institutions that issue the cards (referred to as the card issuer); and (iv) the financial institutions that sign up merchants to accept the cards (referred to as the acquirer). In a typical four-party payment card transaction, the merchant pays a "merchant discount fee" (i.e., a merchant service charge) to the acquirer in recognition of the services provided by the acquirer in facilitating payment card acceptance by the merchant. However, a substantial portion of the benefits that the merchant receives through card acceptance comes from the value of the network and services performed by the card issuer. For example, the card issuer underwrites and extends credit to the cardholder of a credit card, which enables the sale. The card issuer assumes the risk of non-payment by the cardholder, which enables the merchant to get paid for the transaction even if card issuer does not. To compensate the card issuer for providing such benefits to the acquirer's merchant customer, the acquirer pays an "interchange fee" to the card issuer in connection with a payment card transaction. The interchange fee helps to partially reimburse the card issuer for the many activities it performs and costs it incurs that enable the acquirer to provide significant benefits and value to its merchant customers. Interchange fees are only one of the many cost components of the merchant discount fees that are established by acquirers and paid by merchants in exchange for card acceptance services provided by acquirers to merchants.

In general, the transaction system and associated methods described above work. However there are situations in which additional convenience for the merchant would be desirable.

One problem for merchants is that they may not know of specific items or items in a generic class of items, that are experiencing extremely significant growth in sales, or may not find out about these items in a timely manner, so that they can order these items, and take part in sales that may be related to a fad or short sales trend, but would nevertheless significantly contribute to profitability. These may be novel, previously unsold items, such as, by way of historical example, the items sold in the Hula Hoop craze of the 1950's, or the Rubik's cube craze of the 1980's.

SUMMARY OF THE DISCLOSURE

The present disclosure provides a system and a method for determining when a selected predetermined number of a specific product or of a type of product has been sold so that an alert can be generated when the number sold exceeds the selected predetermined number.

The present disclosure also provides such a system and a method that issues an additional alert when data in a database indicates that the number of a specific product or of a type of product being sold in a given time frame is below a selected number, or below that number for a selected period of time.

The present disclosure further provides that transaction rules can be set to monitor transaction data to achieve this result so that a merchant can receive an alert at any time and at almost any location.

The present disclosure yet further provides that the determining of the alert can be accomplished by storing in an electronic storage device a database of merchant transactions, accessing information in the database concerning the transactions including when a specific product or type of product has been sold, and assembling the information concerning sales of the specific product or type of product to determine the number of the specific product or type of product sold in a selected time frame, to compare the number of the specific product or type of product sold to the selected predetermined number.

The present system and method can include a database that contains data concerning transactions in a given geographic region. It can be filtered to remove cardholder information related to the transactions. The data can be accessed using a web site and an Internet connected device for connecting to the web site. The Internet connected device can be one of a mobile telephone, a computer, a tablet and a personal digital assistant, including an iPad®. An application that causes the Internet connected device to access the data in the database via the web site can be used.

The present method can be used in a three or four party payment card processing system.

The present disclosure further provides a computer readable non-transitory storage medium storing instructions of a computer program, that when executed by a computer system, result in performance of steps of the method described for determining when a predetermined number of a specific product or of a type of product has been sold.

BRIEF DESCRIPTION OF THE DRAWINGS

A component or a feature that is common to more than one drawing is indicated with the same reference number in each of the drawings.

DESCRIPTION OF THE PREFERRED EMBODIMENT

Figure 1:
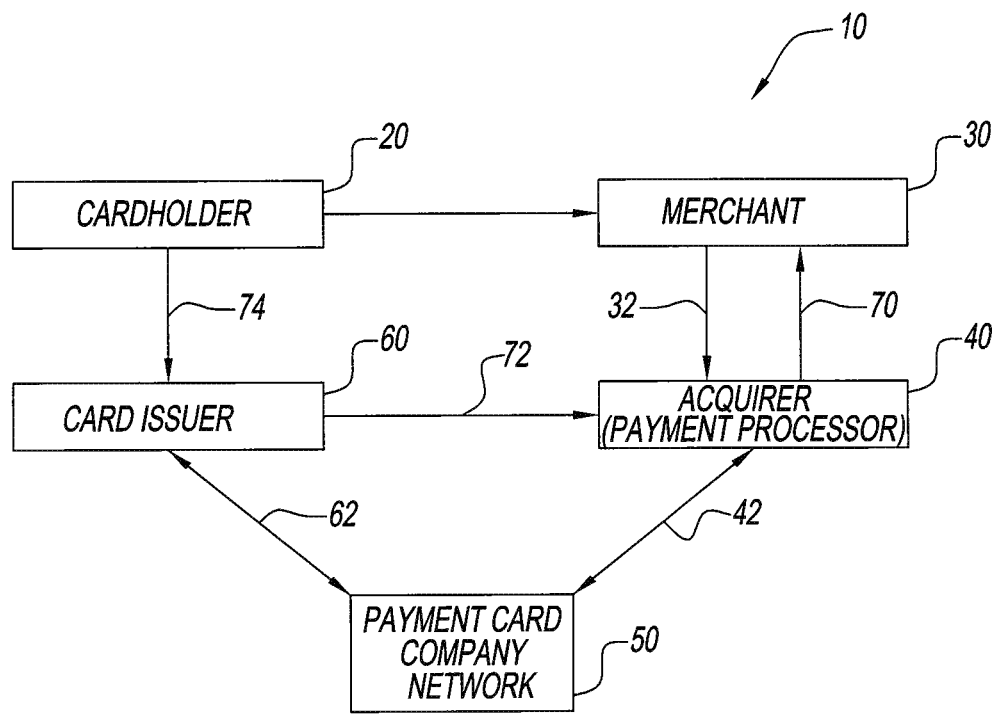
FIG. 1 is a diagram of a four party payment card system.

Referring to the drawings and, in particular, FIG. 1, there is shown a four party system 10. The cardholder 20 submits the credit card to the merchant 30. The merchant's point of sale device (80 in FIG. 2) communicates 32 with his acquiring bank or acquirer 40, which acts as a payment processor. The acquirer 40, at 42, initiates the transaction on the payment card network 50. The payment card network 50 routes the transaction to the issuing bank or card issuer 60, which is identified using information in the transaction message, more fully described below. The card issuer 60 approves or denies an authorization request. At 62, the card issuer 60, then routes, via the payment card network 50 an authorization response back to the acquirer 40. The acquirer 40 sends approval to the POS device of the merchant 30. Seconds later the cardholder completes the purchase and receives a receipt.

The account of the merchant 40 is credited at 70 by the acquirer 40. The card issuer 60 pays the acquirer at 72. Eventually, at 74, the cardholder 20 pays the card issuer 60.

Figure 2:
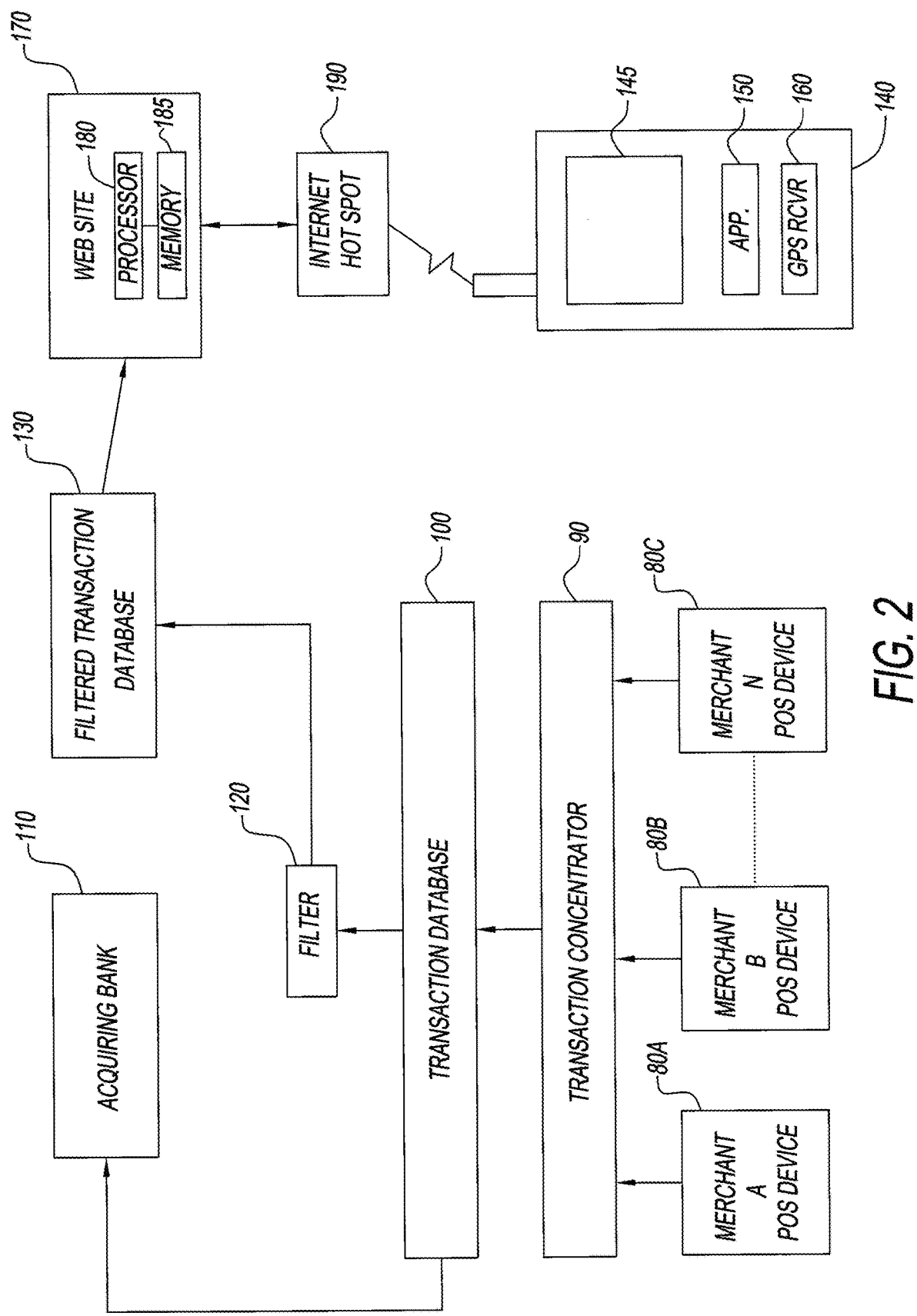
FIG. 2 is a block diagram of a portion of a payment card system modified in accordance with one aspect of the present disclosure.

Referring to FIG. 2, each merchant has on their premises at least one point of sale device 80, such as a card swiping machine, or some other type of device well known in the art for initiating customer transactions. These point of sale devices 80A, 80B, . . . 80N, generally also have keyboard data entry pads for instances when it becomes necessary to enterdata manually, such as when a card's magnetic coding becomes difficult to read, or when the customer provides card data by telephone. Point of sale devices 80A, 80B, . . . 80N are connected by a suitable network to a transaction concentrator 90, for a given geographic area, which concentrates the transaction information. Each concentrator 90 has associated with it a transaction database 100 that stores information concerning the transaction. Transaction database 100 may acquire information from more than one concentrator 90, and thus may include data from a wide geographic area. Information from the concentrator 90 also is routed to a respective acquiring bank 110 that, in turn, routes the information so that transactions are properly completed using the system illustrated in FIG. 1.

While it is advantageous to maintain a local database including transactions in a given geographic area, there is no such limitation on various embodiments of the present disclosure. For example, if the present disclosure is used with a three party system, data for a relatively large geographic region may be stored in a single database at a central location. The time to search this more extensive database, and provide a response to a user, may be slightly greater, but the user will obtain the same useful information. If the product is to be ordered via the Internet, then it is advantageous to provide information on a much broader geographic basis, including national or international information. However, the merchant will need to take into account shipping costs for national product availability, and shipping and currency translation costs, and associated fees, for international transactions.

Information that is exchanged across the network for each credit or debit card financial transaction message includes the following characteristics: acquirer identifier/card accepter identifier (the combination of which uniquely defines the merchant); merchant address (i.e., full address and or GPS data); merchant category code (also known as card acceptor business code), that is an indication of the type of business the merchant is involved in (for example, a gas station); local transaction date and time, cardholder base currency (i.e., U.S. Dollars, Euro, Yen, etc.), the transaction environment or method being used to conduct the transaction, product specific data such as SKU line item data, and cost of the transaction.

Transaction records stored in transaction database 100 contain information that is highly confidential and must be maintained as such to prevent fraud and identity theft. The transaction records stored in transaction database 100 are sent through a filter 120 (FIG. 3) that removes confidential or other sensitive information, but retains records concerning merchant identification and the occurrence of transactions at various times; preferably in real time. The filtered data is stored in a filtered transaction database 130 which may be accessed as described below. The data of the database may be stored in any type of memory, including a hard drive, a flash memory, on a CD, in a RAM, or any other suitable memory.

The following example of an approach to accessing the data involves a mobile telephone. However, it will be understood that that there are various other approaches, technologies and pathways that can be used. These include various types of alerts such as telephone calls, text messages, instant messages and e-mails. However, for speed of response, a so called "push" technology should be used, where information is "pushed" out to the user, rather than waiting until the user decides to again check for messages.

A mobile telephone 140, having a display 145, may be used to access a website 170 on the Internet, via an Internet connected Wi-Fi hot spot 190 (or by any telephone network, such as a 3G or 4G system, on which mobile telephone 140 communicates), by using application 150, designed for use with the embodiment described herein. Website 170 is linked to database 130 so that authorized users of website 170 may have access to the data contained therein. The manner in which that access is exploited, in accordance with the present disclosure, is described with respect to FIG. 4.

Web site 170 has a processor 180 for assembling data from filtered transaction database 130 for responding to user inquiries, as more fully discussed below with respect to FIG. 4. A memory 185 associated with web site 170, having a non-transitory computer readable medium, stores computer readable instructions for use by processor 180 in implementing the operation of the disclosed embodiment.

The system and method described herein are preferably used with a mobile device, because, in general, it may advantageously serve individuals who are away from a home or business location, and would like to receive "pushed" messages, so that transactions based on the information received can be initiated promptly. Fads producing significant sales may occur at any time, or may be associated with the time before an important day, such as Christmas. However, it will be understood that web site 170 may be accessed from a home or a business computer, including a desk top, lap top, or notebook computer, from a personal digital assistant, or any other Internet connected device, such as a tablet (for example, a device such as an iPad®).

Figure 3:
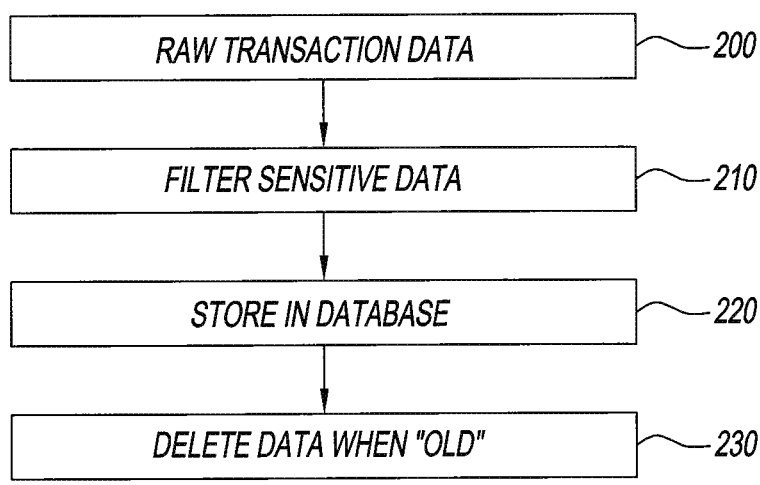
FIG. 3 is a flow chart representing the manner in which acquired data is filtered to preserve confidentiality.

Referring to FIG. 3, the operation of filter 120 of FIG. 2 is illustrated. The raw transaction data usually exchanged over the network is acquired at 200. At 210, customer sensitive information such as the credit card number and expiration date and other customer sensitive information is removed. At 220, the remaining data is stored in database 130 (FIG. 2). At 230, after a relatively short time, data which is no longer current or has become "old" in the context of the present embodiment, can be removed from the database. This serves to conserve space in the memory associated with filtered transaction database 130 and is permissible because, in general, transaction data which is more than, for example, more than several days old will not be helpful in indicating whether a particular product is still being sold. Further, if the transaction data indicates that the product has not been sold for some time, in sufficient quantity, the fad may have run its course.

Figure 4:
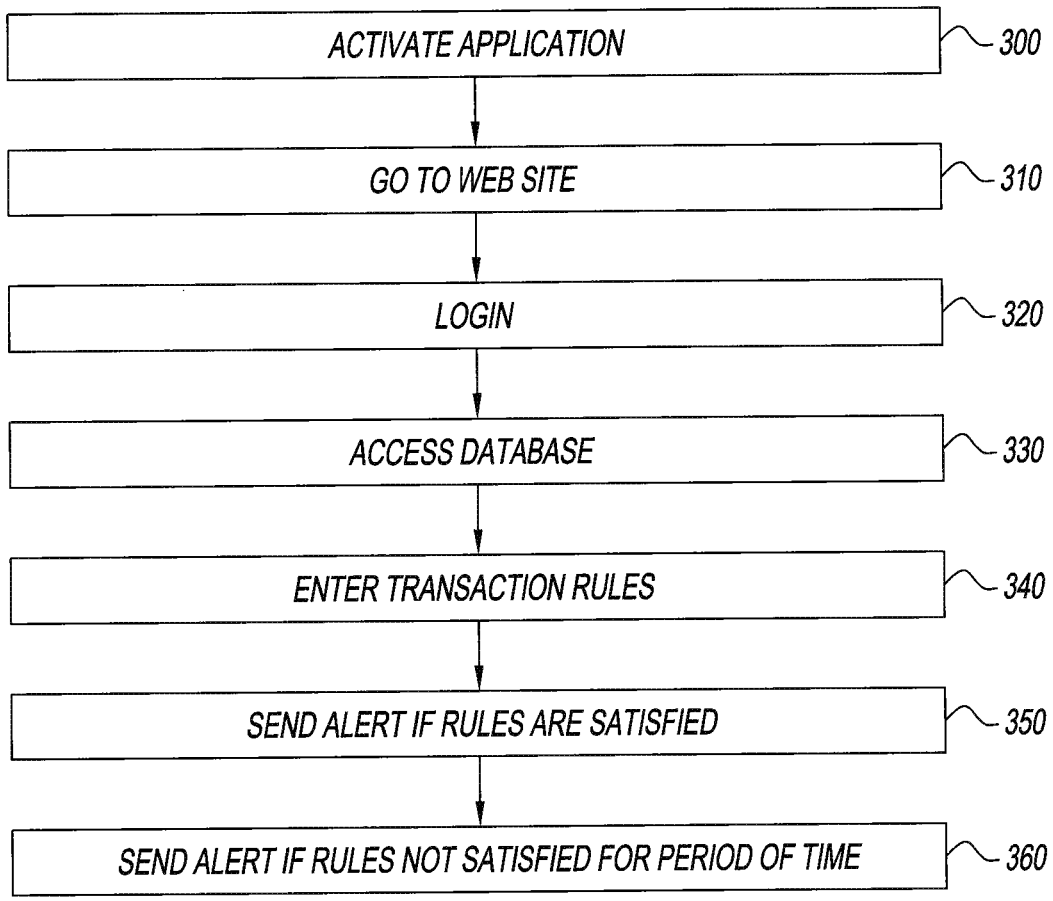
FIG. 4 is a flow chart illustrating the manner in which the system in accordance with the present disclosure is used.

FIG. 4 illustrates the manner in which the present method or system is used by a customer. At 300, the user activates application 150 on mobile telephone 140 (FIG. 2). Assuming that Internet access is available, at 310, optionally, the user will be directed to a log-in page of website 170 (FIG. 2). At 320, the user logs in with a user identification and password in a conventional manner, well known in the art. At 330, access is granted to the information in database 130

The manner in which the owner of web site 170 exploits the present method and system can vary. The web site may be available free to selected merchants; for example those having at least a given monthly or annual sales volume. Alternatively, a user fee may be charged, on a time of use, or periodic basis (such as monthly). Web site 170 may be made available only to merchants conducting transactions with cardholders of the type of card being used to make those transactions, or only for free to such merchants. There are other possibilities for providing access to the web site.

At 340, using a screen provided by application program 150 on mobile telephone 140, the user enters the transaction rules desired. For example, a merchant can set a product volume threshold alert by specifying the following:

Geographical Area=New York, N.Y.; a merchant category (for example toys); a sales volume (i.e., number of items per day, per week or per month). Further, the merchant can also elect to block the sending of alerts for those items on a list of specific items (based on, for example, selected SKU or line item data) or based on all previously known items, so as to identify only items not previously sold.

In one specific example, a toy merchant in California creates a product volume threshold alert with rules as follows: geographical area=state of California; business category=toys; thresholds of units sold=500 units per day; exclude=a list of 100 specified products.

These rules are implemented as follows: transaction data for the geographical area of the State of California of the specified business type (in this case, toys) is scanned for each 24 hour period after the rule is created. The distinct product identifier and associated sum is established. If any of the product identifiers have a sum that exceeds the specified threshold (500 units) and are not on the exclude list, an alert is created and sent 350 (by SMS, e-mail, text message, voice mail, etc.) to inform the merchant of the item details and volume.

In another specific example, a sports apparel merchant in Poughkeepsie, N.Y. is interested in obtaining the trendiest items which typically are sold first in Manhattan. The merchant creates product volume threshold alert rules as follows: geographical area=Manhattan; business category=sports apparel; threshold of units sold=300 units per day; exclude=all previously known product identifiers.

These rules are implemented as follows: The exclude list consists of all product identifiers previously received (prior to the rules being implemented). Transaction data for the geography specified of the specific business type (in this case sports apparel) is scanned for each twenty four hour period. The distinct product identifier and associated sum is established. If any of the product identifiers have a sum that exceeds the specified threshold (300 units per day) and are not on the exclude list, an alert is created and sent 350 (by SMS, e-mail, text message, voice mail, etc.) to inform the merchant of the item detail and volume.

When a scan is run by application 150, against filtered transaction database 130, but sales volume above the established threshold has not taken place for some time, an alert may be sent 360, in any of the ways discussed above, to indicate that the item is no longer generating significant sales. For example, volume may have fallen below the threshold of units sold for more than five calendar days, or for more than three business days. In these cases, the fad may be over. If for some reason the merchant has not yet acted to purchase the item, the merchant may elect to forego purchasing the item. If the item was purchased and is in stock, the merchant may elect to carefully evaluate whether to place any additional orders for the item, to forgo ordering additional such items, or if commercially feasible, to cancel orders which have not yet been shipped to the merchant. As another alternative, as part of establishing the product volume threshold alert rules, a second threshold of sales in a given time period, generally lower than the first threshold, may be established. A rule may then be established that if sales are below this threshold for a predefined period of time, an alert is sent out. Again, this may indicate that the fad is over, and the merchant may be able to exercise one of the options mentioned above, to avoid losses on a product for which sales volume has decreased materially. Also, merchants needs to watch for explosive sales growth of an item in a given geographic region (in particular, where one or more of their business establishments are located). Transaction rules can be set to monitor transaction data to achieve this result. A merchant can receive an alert at any time and at almost any location.

Thus, it is clear that the embodiments of the present disclosure described herein benefits merchants, as they are proactively given timely information on the sales status of items in a specific geographic area, or in an entire geographic region. The system and methods benefit product vendors because potential customers (the merchants) are proactively informed of the sales status of particular items, thus increasing sales. The product vendors also avoid the difficulties, including at least the time and expense, associated with having to provide updates to merchants, as sales volume for particular items become available.

The product alerts rules can be established for a specific product, or for the generic term for the type of product. For example, an alert can be set for a specific product, such as a particular Barbie® doll by SKU number. An alert can also be set for the general term "dolls", for example, by generating a list of products with match string "doll" of either upper or lowercase in the SKU data. Alternatively, a separate reference database that maps SKUs or line items or other product identifiers to characteristics of the product: doll, plastic, Barbie® etc. can be used. The generic term toys can be used as described above.

It will be understood that while the present disclosure has been described primarily with respect to the four party credit card system, it can also be applied, as noted above, to a three party credit card system. Further, with suitable modifications, as will be understood by one skilled in the art, it can be applied to other kinds of payment card systems, such as debit card charging systems.

The terms "comprises" or "comprising" are to be interpreted as specifying the presence of the stated features, integers, steps or components, but not precluding the presence of one or more other features, integers, steps or components or groups thereof.

It will be understood that the present disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for monitoring transaction data to alert a user when a selected predetermined number of a specific product or type of product has been sold within a selected time frame, the method performed by a processor executing operations, in accordance with instructions embodied in a memory, the method comprising:
    receiving transaction data from a transaction concentrator into a payment card system that is communicatively connected by the transaction concentrator to a plurality of point of sale devices for the payment card system, the transaction data including a plurality of product identifiers for a specific product or type of product sold during a payment card transaction, and a time of sale;
    storing the transaction data in a transaction database of the payment card system;
    providing a web interface for a user device, wherein the web interface is configured to allow the user device to generate and submit an automated transaction rule with predefined criteria,
    receiving the automated transaction rule from the user device configured to define a product sales volume alert, wherein the automated transaction rule comprises the predefined criteria including at least one product identifier of the plurality of product identifiers, a time frame, and a threshold quantity of units of product associated with the at least one product identifier;
    programming the processor with the automated transaction rule and at least one threshold quantity criterion;
    scanning the transaction database for transactions that meet the automated transaction rule during the time frame to determine an actual quantity of units of product sold that satisfy the transaction rule;
    comparing the actual quantity to the threshold quantity;
    generating an alert when the actual quantity exceeds the threshold quantity; and
    transmitting the alert to the user device.

2. The method according to claim 1, wherein the plurality of product identifiers include at least one product identifier selected from the group consisting of: a specific product, a product type, an SKU number, and a text string.

3. The method according to claim 1, further comprising:
    filtering out personal cardholder information from the raw transaction data to yield filtered information; and
    storing the filtered information in a web accessible filtered transaction database, wherein the filtered information is directly accessible via a website over the Internet.

4. The method according to claim 3, further comprising:
    deleting from the filtered transaction database filtered transaction data that is no longer current based on the time of sale, wherein the payment card system is configured to identify data as no longer current when an actual quantity of units of product sold does not meet the at least one threshold quantity criterion within a predefined time period.

5. The method according to claim 1, wherein the transaction rule criteria further comprises an exclusion criterion of at least a second product identifier of the plurality of product identifiers, and a product that meets the exclusion criterion is not included in the actual quantity.

6. The method according to claim 1, further comprising:
    scanning the transaction database a second time for transactions that meet the automated transaction rule during the time frame;
    generating a second alert when the actual quantity falls below the threshold quantity criterion; and
    transmitting the second alert to the user device.

7. The method according to claim 1, further comprising:
    generating the second alert when the actual quantity falls below the threshold quantity criterion for the predefined period of time; and
    transmitting the second alert to the user device,
    wherein the threshold quantity criterion includes both the threshold quantity for the automated transaction rule generated by the user device and a threshold quantity generated by the payment card system; and
    wherein the threshold quantity generated by the payment card system is lower than the threshold quantity for the automated transaction rule generated by the user device.

8. The method according to claim 1, wherein the alert is at least one alert selected from the group consisting of: a short message service (SMS) message, an e-mail, a text message, and a voice mail.

9. The method according to claim 1,
    wherein the plurality of point of sale devices comprises a first point of sale device located in a first geographic area and a second point of sale device located in a second geographic area different than the first geographic area,
    wherein the payment card system comprises at least a first transaction concentrator and a second transaction concentrator, wherein the first transaction concentrator receives the raw transaction data from the first geographic area, and the second transaction concentrator receives the raw transaction data the second geographic area,
    wherein the raw transaction data includes geographic area information, and
    wherein the transaction rule further comprises a desired geographical area.

10. The method according to claim 9, wherein the first or second geographic area is at least one area selected from the group consisting of: a city, a state, and a region.

11. The method according to claim 9, wherein the geographic area information is obtained by a global positioning system (GPS) unit communicatively coupled to at least the first point of sale device.

12. A system configured to monitor transaction data to alert a user when a selected predetermined number of a specific product or type of product has been sold within a selected time frame, the system comprising:
 a plurality of point of sale devices for a payment card system, wherein each point of sale device is configured to obtain raw transaction data from a payment card transaction, the raw transaction data including a plurality of product identifiers for a specific product or type of product sold during the payment card transaction, a time of sale, and confidential payment cardholder information;
 a transaction concentrator communicatively connected to the plurality of point of sale devices;
 a transaction database;
 a web interface for a user device, wherein the web interface is configured to allow the user device to generate and submit an automated transaction rule with predefined criteria,
 a processor and a memory with instructions that are readable by the processor and cause the processor to:
  receiving transaction data from the transaction concentrator;
  store the transaction data in a transaction database;
  receive the automated transaction rule from the user device, wherein the transaction rule comprises the predefined criteria including at least one product identifier of the plurality of product identifiers and a time frame, to define a sales volume;
  program the processor with the automated transaction rule and at least one threshold quantity criterion;
  scan the transaction data a first time for transactions that meet the automated transaction rule during the time frame, to determine from the filtered transaction data, an actual quantity of units of product sold that satisfy the transaction rule;
  compare the actual quantity to the threshold quantity;
  generate an alert when the actual quantity exceeds the threshold quantity; and
  transmit the alert to the user device.

13. The system according to claim 12, wherein the plurality of product identifiers include at least one product identifier selected from the group consisting of: a specific product, a product type, an SKU number, and a text string.

14. The system according to claim 12, wherein the transaction rule further comprises an exclusion criterion for at least a second product identifier of the plurality of product identifiers, and wherein a product excluded by the exclusion criterion is not included in the actual quantity.

15. The system according to claim 12, wherein the system is configured to generate a second alert when a quantity of units of product sold does not meet the threshold quantity of products sold within a predefined time period after the first time period;
 wherein the at least one threshold quantity criterion for the second alert includes a criterion selected from:
  the threshold quantity for the automated transaction rule generated by the user device; and
  a threshold quantity generated by the payment card system.

16. The system according to claim 15, wherein the instructions further cause the processor to:
 scan the filtered transaction data a second time;
 generate the second alert when the actual quantity falls below the threshold quantity; and
 transmit the second alert to the user device.

17. The system according to claim 12, wherein the alert is at least one alert selected from the group consisting of: a short message service (SMS) message, an e-mail, a text message, and a voice mail.

18. The system according to claim 12, further comprising:
 a transaction concentrator of the payment card system communicatively connected to each point of sale device and receiving the raw transaction data therefrom; and
 a web-accessible filtered transaction database having filtered information, wherein the filtered information is directly accessible via a website over the Internet;
 wherein the instructions further cause the processor to:
 filter out personal cardholder information from the raw transaction data to yield filtered information; and
 store the filtered information in the filtered transaction database.

19. The system according to claim 18, wherein the plurality of point of sale devices comprises a first point of sale device located in a first geographic area and a second point of sale device located in a second geographic area different than the first geographic area,
 wherein the transaction concentrator comprises at least a first and a second transaction concentrator, wherein the first transaction concentrator receives the raw transaction data from the first geographic area, and the second transaction concentrator receives the raw transaction data from the second geographic area,
 wherein the raw transaction data includes geographic area information, and
 wherein the transaction rule further comprises a desired geographical area.

20. The system according to claim 18, wherein the instructions further cause the processor to delete filtered transaction data from the filtered transaction database that is no longer current.

* * * * *